United States Patent
Handermann et al.

(10) Patent No.: US 7,601,414 B2
(45) Date of Patent: Oct. 13, 2009

(54) STITCHBONDED INHERENTLY FLAME RESISTANT FABRICS

(75) Inventors: Alan C. Handermann, Asheville, NC (US); Bob McKinnon, Newton, NC (US); Frank J. Land, Island Park, NY (US)

(73) Assignee: Sumlin Holdings, Inc., Hickory, NC (US)

( * ) Notice: Subject to any disclaimer, the term of this patent is extended or adjusted under 35 U.S.C. 154(b) by 88 days.

(21) Appl. No.: 11/898,023

(22) Filed: Sep. 7, 2007

(65) Prior Publication Data

US 2008/0085651 A1   Apr. 10, 2008

Related U.S. Application Data

(60) Provisional application No. 60/842,945, filed on Sep. 8, 2006.

(51) Int. Cl.
*B68G 11/03* (2006.01)
*D04H 1/02* (2006.01)
*A47C 17/86* (2006.01)

(52) U.S. Cl. .................... 428/102; 442/402; 442/403; 442/405; 442/414; 442/415; 442/416

(58) Field of Classification Search .................... None
See application file for complete search history.

(56) References Cited

U.S. PATENT DOCUMENTS

| 6,146,759 | A | 11/2000 | Land |
| 6,287,690 | B1 | 9/2001 | Land |
| 6,410,140 | B1 * | 6/2002 | Land et al. ................ 428/377 |
| 6,553,749 | B2 | 4/2003 | Land et al. |
| 6,606,846 | B2 | 8/2003 | Land |
| 2005/0144728 | A1 * | 7/2005 | Jones et al. .................... 5/698 |
| 2007/0065685 | A1 * | 3/2007 | Bridgeman et al. ......... 428/920 |

* cited by examiner

*Primary Examiner*—Jennifer A Chriss
(74) *Attorney, Agent, or Firm*—Crowell & Moring LLP

(57) ABSTRACT

The invention relates to an inherently flame resistant (FR) stitchbonded nonwoven fabric for mattresses, boxsprings, upholstered furniture, top-of-the-bed, office panel, transportation seating or any end use application where a FR textile material is desired. Two of the preferred forms of this invention include:

100% cotton. 100% rayon, 100% lyocell, cotton/non-FR fiber blends, rayon/non-FR fiber blends or lyocell/non-FR fiber blend battings that are stitchbonded with flame resistant fiberglass core-spun yarn.

100% cotton, 100% rayon, 100% lyocell, cotton/non-FR fiber blends, rayon/non-FR fiber blends or lyocell/non-FR fiber blend battings that are stitchbonded with FR spun yarn.

8 Claims, No Drawings

STITCHBONDED INHERENTLY FLAME RESISTANT FABRICS

CROSS REFERENCE TO RELATED APPLICATIONS

The present application claims priority to U.S. Provisional Application Ser. No. 60/842,945, filed Sep. 8, 2006, which is hereby incorporated by reference in its entirety.

BACKGROUND OF THE INVENTION

1. Field of the Invention

The invention relates to an inherently flame resistant (FR) stitchbonded nonwoven fabric for mattresses, boxsprings, upholstered furniture, top-of-the-bed, office panel, transportation seating or any end use application where a FR textile material is desired.

2. Description of the Related Art

It is well known in the textile industry to produce FR products for use in upholstered furniture, mattresses, boxsprings, automotive seating, public transportation seating, aircraft seating, office panels and the like, using needlepunched, highloft, spunbond or spunlace nonwoven fabrics or woven or knit fabrics formed of natural or synthetic fibers which are either inherently FR or treated or coated with fire retarding chemicals. Conventional fire retarding chemicals include borate-based, halogen-based, phosphorus-based, melamine-based and/or antimony-based chemicals. Unfortunately, many of these above mentioned FR products do not impart some of the key comfort and softness features desired by manufacturers of open-flame resistant end-use articles. The use of topically applied FR chemicals, in some of the above mentioned FR products is also problematic from both a durability and toxicological perspective.

Although stitchbonded nonwoven fabrics which have been chemically treated to achieve their flammability properties are available in the industry; the FR properties of these types of products are not durable and the chemicals can leach and transfer to unwanted areas of the end-use product and to the surrounding living area. It is the object of the present invention to describe an inherently flame resistant stitchbonded nonwoven product that provides the desired softness, comfort and feel, while still providing the required level of flame protection at an economical price.

SUMMARY OF THE INVENTION

To overcome or conspicuously ameliorate the disadvantages of the related art, it is an object of the present invention to provide a stitchbonded nonwoven capable of passing open flame tests through the use of inherently flame resistant stitching, while imparting desirable soft, comfortable properties to the composite article.

FR spun stitching yarns, for use in the invention, are blends of both char-forming FR staple fiber and oxygen depleting FR staple fiber and, optionally, also non-FR staple fibers. FR char-forming fibers are those which exhibit little shrinkage when exposed to direct flame and are not spun from polymers manufactured with halogenated monomers. Oxygen depleting FR fibers are spun from polymers manufactured with halogenated monomers. Oxygen depleting FR fibers generate decomposition gases, when exposed to flame, which help to prevent autoignition of the decomposition products coming from underlying layers of, for example, polyurethane foam and they also help extinguish residual flame which may emanate from overlying dress cover fabric or the like. Oxygen depleting gases from the fibers spun from polymers manufactured with halogenated monomers, when included in the fiber blend, also coat and protect the carbonaceous char formed during decomposition of the char forming FR fibers.

Fiberglass core-spun stitching yarns, for use in the invention, include those known in the textile industry as Alessandra® yarn (U.S. Pat. Nos. 6,146,759; 6,287,690; 6,410,140; 6,606,846; 6,553,749 by McKinnon Land LLC) and Firegard® yarn (by Springs Industries).

Two of the preferred forms of this invention include:
1) 100% cotton, 100% rayon, 100% lyocell, cotton/non-FR fiber blends, rayon/non-FR fiber blends or lyocell non-FR fiber blend battings that are stitchbonded with fiberglass core-spun yarns.
2) 100% cotton, 100% rayon, 100% lyocell, cotton/non-FR fiber blends, rayon/non-FR fiber blends or lyocell/non-FR fiber blend battings that are stitchbonded with FR spun yarns.

Advantages of the stitchbonded flame resistant fabric of this invention include:
a) no topically applied FR chemicals need be used in or on the barrier fabric
b) soft hand
c) drapable, stretchable and conformable fabric over underlying materials
d) inherent FR properties are durable and cannot be laundered out
e) economical non-FR fibers can be utilized in the batting.

In the preferred usages of the present invention, the FR stitchbonded fabrics are incorporated into composite articles such that when tested according to test methods such as: California Test Bulletin 129 (TB129), California Test Bulletin 133 (TB133), California Test Bulletin 603 (TB603), California Test Bulletin 604 (TB604), the Consumer Product Safety Commission (CPSC) Flammability Test for mattresses and boxsprings (16 CFR Part 1633), bedclothing and upholstered furniture, British Standard 5852 crib 5 (BS5852), the British Standard 7176 and the British Standard 7177, the British Standard 7176 and the British Standard 7177, etc.; the FR stitchbonded fabrics allow for the continued use of conventional materials such as dress cover fabrics and polyurethane foams or they can serve as the dress cover material itself, while still passing these open flammability tests. It is understood by someone skilled in the art that the FR stitchbonded fabrics described in this invention, even at overall lower basis weights and different FR spun yarn compositions, can be made to pass less stringent open flame tests than those mentioned above. The preferred stitchbonded FR fabrics of the invention range in overall basis weight between 70 and 1000 $g/m^2$ and have stitching yarn contents between 5% and 50%. The most preferred stitchbonded fabrics deemed well suited for many intended uses of the present application including flame barrier fabrics for bedding related products, range in overall basis weight between 100-500 $g/m^2$ and have stitching yarn content between 15%-35%.

It is a further object of the invention to provide a composite article such as a mattress and/or an upholstered furniture product manufactured with the product forms made with the stitchbonded FR fabric that can pass various open flammability tests.

DETAILED DESCRIPTION OF PREFERRED EMBODIMENTS OF THE INVENTION

The present invention is directed at providing an inherently FR stitchbonded fabric that can be utilized to pass open flammability tests such as: California Test Bulletin 129 (TB129), California Test Bulletin 133 (TB133), California Test Bulletin 603 (TB603), California Test Bulletin 604 (TB604), the CPSC's open flame test for mattress/boxsprings (16 CFR Part 1633), top-of-the-bed and upholstered furniture applications, British Standard 5852 crib 5 (BS5852), British Standard 7176, British Standard 7177, etc. These stitchbonded FR fabrics can allow for the continued use of conventional dress cover fabrics, fiber-fills, polyurethane foams and the like, while still passing these large open flame tests or can serve as a replacement for the non-FR dress cover and mattress ticking fabrics. It is understood by someone skilled in the art that these flame barrier fabrics can be modified by changing the basis weight or the composition of the stitching to pass less stringent small open flame tests.

Stitchbonded nonwoven fabrics and processes and machines for making such fabrics are well known. Typically, stitchbonded nonwoven fabrics are made by multi-needle stitching a fibrous material with one or more stitching thread systems. Typically, the material consists of substantially non-bonded fibers, although material consisting of bonded fibers also has been used. The stitching threads form patterns of stitches in the fibrous material. Many different kinds of fibrous materials have been employed to produce stitchbonded fabrics, including carded webs, thin felts, spunlace fabrics, spunbonded nonwoven sheets, paper and the like. These known fibrous layers are made from various natural and synthetic organic staple fibers or continuous filaments.

Known processes for making stitchbonded fabrics typically include the steps of (a) feeding a fibrous material to a stitchbonding machine; (b) threading a multi-needle bar of the stitchbonding machine with stitching threads; (c) inserting the stitching thread into the fibrous material to form a pattern of spaced apart, interconnected rows of stitches, thereby creating the stitchbonded fabric; (d) removing the stitchbonded fabric from the stitchbonding machine; and (e) optionally subjecting the stitchbonded fabric to further finishing operations, such as shrinking, heat setting, molding, coating, impregnating, printing, dyeing and the like.

Among the conventional stitching threads that have been employed in stitchbonding operations are of natural fibers (e.g., cotton, wool); fibers or filaments of fully drawn, crystalline polymers (e.g., nylon, polyester); fibers of partially molecularly oriented synthetic organic polymer; and threads of spandex, or of other elastic or elastomeric materials.

To date, the character and appearance of known stitchbonded fabrics has depended mainly on the particular types of yarns, patterns of stitches formed by the stitching yarns, the amount of shrinkage and other finishing steps used in the manufacture of the fabrics. In general, fabrics and battings that can be pierced by a stitchbonding needle, and that can be fed through a ⅕ inch (5 mm) gap, can be stitchbonded.

Stitchbonded FR fabrics of the present invention typically comprise of 5% to 50% stitching yarn and 50% to 95% of a nonwoven fiber batting. Fabric basis weights range from less than 1 ounces per square yard, to more than 30 ounces per square yard. More preferably, the FR stitching yarn should be between 15%-35% of the total stitchbonded nonwoven batting weight.

Upon direct exposure to flame and high heat, the stitchbonded FR fabric of this invention forms a strong char with essentially no shrinkage in the x-y plane. This char forming behavior prevents cracking of the flame barrier, protecting the underlying layers of, for example, foam materials in the composite article from being exposed to direct flame and high heat. The strong char may also help to block the flow of oxygen and volatile decomposition gases, while slowing the transfer of heat by creating an effective thermal insulation barrier. The char forming behavior of the stitchbonded FR barrier fabric considerably lengthens the time it takes the underlying materials for example polyurethane, to decompose and ignite and also be designed to help existing "surface" flame to self-extinguish.

FR spun stitching yarns can contain any of the following char forming and oxygen depleting fibers. The above char and oxygen depleting fibers can, optionally, also be blended with up to 80% of standard non-FR fibers, such as those also listed below:

Char forming fibers:
melamines (BASOFIL by Basofil Fibers LLC, meta-aramids such as poly(m-phenylene isophthalamide), for example, those sold under the tradenames NOMEX by E.I. Du Pont de Nemours and Co., TEIJINCONEX by Teijin Limited, CH17NFM7NEX@ARAMID 1313 by Guangdong Charming Chemical Co. Ltd. and FENYLENE by Russian State Complex; para-aramids such as poly(p-phenylene terephthalamide), for example, that sold under the tradename KEVLAR by E.I. Du Pont de Nemours and Co., poly(diphenylether para-aramid), for example, that sold under the tradename TECHNORA by Teijin Limited, and those sold under the tradenames TWARON by Acordis and FENYLENE ST (Russian State Complex); polybenzimidazole such as that sold under the tradename PBI by Hoechst Celanese Acetate LLC, polyimides, for example, those sold under the tradenames P-84 by Inspec Fibers and KAPTON by E.I. Du Pont de Nemours and Co.; polyamideimides, for example, that sold under the tradename K.ERMEL by Rhone-Poulenc; partially oxidized polyacrylonitriles, for example, those sold under the tradenames FORTAFIL OPF by Toho Tenax America, AVOX by Textron Inc., PYRON by Zoltek Corp., PANOX by SGL Technik, THORNEL by American Fibers and Fabrics and PYROMEX by Toho Rayon Corp.; novoloids, for example, phenol-formaldehyde novolac, for example, that sold under the tradename KYNOL by Gun Ei Chemical Industry Co.; poly (p-phenylene benzobisoxazole) (PBO), for example, that sold under the tradename ZYLON by Toyobo Co.; poly(p-phenylene benzothiazoles) (PBT); polyphenylene sulfide (PPS), for example, those sold under the tradenames RYTON by American Fibers and Fabrics, TORAY PPS by Toray Industries Inc., FORTRON by Kureha Chemical Industry Co. and PROCON by Toyobo Co.; flame retardant viscose rayons, for example, those sold under the tradenames LENZING FR by Lenzing A.G. and VIS1L Sateri 0)1 Finland; polyetheretherketones (PEEK), for example, that sold under the tradename ZYEX by Zyex Ltd.; polyketones (PEK), for example, that sold under the tradename ULTRAPEK by BASF; polyetherimides (PEI), for example, that sold under the tradename ULTEM by General Electric Co. and fiber combinations thereof.

Oxygen depleting fibers:
chloropolymeric fibers, such as those containing polyvinyl chloride or polyvinylidene homopolymers and copolymers, for example, those sold under the tradenames THERMOVYL L9S, ZCS & ZCB, FIBRAVYL L9F, RETRACTYL L9R, ISOVYL MPS by Rhovyl S.A; PIVIACID, Thueringische; VICLON by Kureha Chemical Industry Co., TEVIRON by Teijin Ltd., ENVILON by Toyo Chemical Co. and VICRON, made in Korea; SARAN by Pittsfield Weaving, KREHALON by Kureha Chemical Industry Co. and OMNI-SARAN by Fibrasomni, S.A. de C.V.; and modacrylics which are vinyl chloride or vinylidene chloride copolymer variants of acrylonitrile fibers, for example, those sold under the tradenames PROTEX by Kaneka and SEF by Solutia.; fluoropolymeric fibers such as polytetrafluoroethylene (PTFE), for example, those sold under the tradenames TEFLON TFE by E. I. Du Pont de Nemours and Co., LENZING PTFE by Lenzing A.G., RASTEX by W.R. Gore and Associates, GORE-TEX by W.R. Gore and Associates, PROFILEN by Lenzing A.G. and TOYOFLON PTFE by Toray Industries Inc., poly(ethylenechlorotrifluoroethylene) (E-CTFE), for example, those sold under the tradenames HALAR by Albany International Corp. and TOYOFLON E-TFE by Toray Industries Inc., polyvinylidene fluoride (PVDF), for example, those sold under the tradenames KYNAR by Albany International Corp. and FLORLON (Russian State Complex), polyperfluoroalkoxy (PFA), for example, those sold under the tradenames TEFLON PFA by E. I. Du Pont de Nemours and Co. and TOYOFLON PFA by Toray Industries Inc., polyfluorinated ethylene-propylene (FEP), for example, that sold under the tradename TEFLON FEP by E. 1. Du Pont de Nemours and Co., a fiber combinations thereof;

Suitable non-FR fibers for blending into the FR spun stitching yarn:

cotton, wool, silk, mohair, cashmere, kenaf, sisal, nylons, polyesters, polyolefins, rayons, lyocells, acrylics, cellulose acetates and polylactides (by Fiber Innovations Technology);

The preferred stitchbonded FR nonwoven fabric of this invention also allows for the manufacture of open flame resistant composite articles which have a soft, comfortable feel, while also permitting the continued use of conventional nonflame retardant dress cover fabrics, conventional non-flame retardant fiberfill, and conventional non-flame retardant polyurethane foams, etc. Alternatively, a stitchbonded FR nonwoven fabric can be produced that acts directly as the dress cover, mattress ticking or filler cloth fabric itself and be screen or heat transfer printed, dyed or coated to suit the desires of the end user. Such composite articles include, upholstered furniture, mattresses, boxsprings, pillows, bedspreads, comforters, quilts, mattress pads, automotive seating, public transportation seating, aircraft seating, office panels and wall panels. The preferred stitchbonded FR fabric of the invention can be used without lamination to the dress cover fabric, which is an advantage over certain forms of currently available flame barriers, since the laminating resins tend to stiffen the "hand" of the fabric. The preferred stitchbonded FR fabric may also be used as a substitute for conventional non-FR dress cover or mattress ticking fabrics. The preferred stitchbonded FR fabric can also, advantageously, be laminated, for example by adhesive coating, to a layer of polyurethane foam, as is current practice in the much of the upholstered furniture industry. This reduces the number of stock units that must be handled in the furniture manufacturing process. Thus, the present invention also provides for continued use of conventional non-flame retardant materials in, for example, upholstered furniture and mattress formation, without altering or disrupting the conventional composite article manufacturing process, except perhaps making the process more simple by reducing one or more steps in a preexisting process such as removing a step of applying FR material to the article.

Composite articles produced and also some of the preferred flame barriers and fabrics of the present invention, can advantageously be free of any fire resistant coatings and topically applied chemicals.

Composite articles manufactured with the inherently FR stitchbonded fabric of the invention have the look, feel and surface characteristics of similar non-FR stitchbonded products made without the subject of this invention, while providing open flame resistance. For example, one of the standard tests for measuring the open flame resistance of a mattress is California TB603. According to this test, a full-scale twin sized mattress and boxspring is exposed to a set of dual flame burners. The side flame burner is held vertically 1 inch from the center point where the mattress and boxspring meet; while a top flame burner is held horizontally 1 inch from the center of the top panel of the mattress in a perpendicular orientation to the side of the mattress. Bed sets utilizing inherently FR stitchbonded fabrics of the present invention quilted directly under the mattress ticking fabric and above a layer of standard non-FR polyurethane foam can be made to pass TB603. Alternatively, stitchbonded fabrics of this invention can serve as the mattress ticking fabric and be made to pass the TB603 flammability test. Other open flame tests for which composite articles of the present invention, or composite mock-ups representing these articles, are intended to pass include:

California Test Bulletin 129, California Test Bulletin 133, California Test Bulletin 604, the proposed Consumer Product Safety Commission (CPSC) Flammability Test (16 CFR Part 1633) for mattresses and boxsprings, bedclothing and upholstered furniture, the composite British Standard 5852 Crib 5, the British Standard 7176 and the British Standard 7177.

The following non-limiting examples I and II are set forth to demonstrate a cost effective stitchbonded inherently FR fabric of the present invention with a soft and comfortable hand and suitable for mattresses and boxsprings which can be manufactured to pass the California TB603 large open flame test or other open flame tests.

EXAMPLE I

Stitchbonded Inherently FR Fabric

A 3.30 ounce per square yard (osy) batting of 100% 5 micronaire cotton is stitchbonded with 20.5/1 Alessandra corespun yarn such that the final fabric weight is 4.45 osy. The stitchbonded FR fabric has the equivalent of 26% Alessandra corespun yarn and 74% cotton batting.

The Alessandra stitching yarn consisted of:
8% melamine fiber (Basofil Fiber)—(in sheath)
15% modacrylic fiber (Kanecaron Protex Fiber)—(in sheath)
35% polyester fiber—(in sheath)
35% multifilament fiberglass—(in core)
7% multifilament nylon fiber—(in core)

EXAMPLE II

Stitchbonded Inherently FR Fabric

A 3.30 ounce per square yard (osy) batting of 100% 5 micronaire cotton was stitchbonded with 30/1 open-end FR spun yarn such that the final fabric weight is 4.20 osy. The stitchbonded FR fabric has the equivalent of 21% of the 30/1 open-end FR spun yarn and 79% cotton batting.

The open-end FR spun yarn used for stitching consisted of:
17% melamine fiber (Basofil Fiber)
17% modacrylic fiber (Kanecaron Protex Fiber)
66% polyester fiber Although the present invention has been described in connection with preferred embodiments, thereof, it will be appreciated by those skilled in the art that additions, deletions, modifications and substitutions not specifically described may be made without departing from the spirit and scope of the invention as defined in the appended claims.

What is claimed is:

1. A flame resistant, stitchbonded nonwoven fabric comprised of batting that is stitchbonded with a fire resistant spun stitching yarn, which is a blend of char-forming flame resistant staple fibers and oxygen depleting flame resistant staple fibers, or a fiberglass core-spun yarn;
   wherein the batting consists of 100% cotton, 100% rayon, 100% lyocell, cotton/non-FR fiber blends, rayon/non-FR fiber blends or lyocell/non-FR fiber blends.

2. The fabric of claim 1, wherein the yarn comprises a blend of char forming flame resistant staple fibers and oxygen depleting flame resistant staple fibers.

3. The fabric of claim 2, wherein the yarn further comprises non-flame resistant staple fibers.

4. The fabric of claim 1, wherein the yarn is comprised of a flame resistant fiberglass core-spun yarn.

5. The fabric of claim 1, comprised of from 5 to 50 wt % of flame resistant stitching yarn, and 50 to 95 wt % of the batting.

6. The fabric of claim 5, wherein the amount of flame resistant stitching yarn ranges from 15 to 35 wt %.

7. The fabric of claim 1, wherein the batting is stitchbonded with a flame resistant fiberglass core-spun yarn.

8. The fabric of claim 5, wherein the batting comprises nonwoven batting.

* * * * *